(12) United States Patent
Jan et al.

(10) Patent No.: US 7,693,718 B2
(45) Date of Patent: Apr. 6, 2010

(54) UPDATE TECHNIQUE FOR SPEECH RECOGNITION APPLICATIONS WITH UNINTERRUPTED (24X7) OPERATION

(75) Inventors: Ea-Ee Jan, Ardsley, NY (US); Benoit Emmanuel Maison, Wavre (BE)

(73) Assignee: International Business Machines Corporation, Armonk, NY (US)

( * ) Notice: Subject to any disclaimer, the term of this patent is extended or adjusted under 35 U.S.C. 154(b) by 1102 days.

(21) Appl. No.: 11/343,622

(22) Filed: Jan. 31, 2006

(65) Prior Publication Data

US 2007/0179787 A1    Aug. 2, 2007

(51) Int. Cl.
*G10L 21/00* (2006.01)
(52) U.S. Cl. ...................................... 704/270
(58) Field of Classification Search ............ 704/270
See application file for complete search history.

(56) References Cited

U.S. PATENT DOCUMENTS 5,376,752 A * 12/1994 Limberis et al. ............... 84/622
6,801,604 B2 * 10/2004 Maes et al. ............... 379/88.17
7,023,979 B1 * 4/2006 Wu et al. ................ 379/265.11
7,110,525 B1 * 9/2006 Heller et al. ........... 379/265.11
7,206,387 B2 * 4/2007 Jan et al. .................. 379/88.01

* cited by examiner

*Primary Examiner*—Susan McFadden
(74) *Attorney, Agent, or Firm*—Stephen C. Kaufman, Esq.; McGinn IP Law Group, PLLC

(57) ABSTRACT

A method of updating an application in a processing system, the aforesaid method comprising the steps of: (a) starting operation of a first version of an application in the aforesaid processing system; (b) starting operation of a second version of the aforesaid application in the aforesaid processing system; and (c) incrementally reallocating processing system resources from the aforesaid first version of the aforesaid application to a second version of the aforesaid application, such that at most one application selected from the aforesaid first version and the aforesaid second version of the aforesaid application operates at full capacity at any time, and such that at least one of the aforesaid first version and the aforesaid second version of the aforesaid application is operating at all times.

1 Claim, 5 Drawing Sheets

UPDATE TECHNIQUE FOR SPEECH RECOGNITION APPLICATIONS WITH UNINTERRUPTED (24X7) OPERATION

FIELD OF THE INVENTION

The present invention relates generally to a processing system, and more particularly, to a voice response system that can be updated with uninterrupted operation.

BACKGROUND OF THE INVENTION

In voice processing systems, resources such as processor time and memory spaces are utilized to perform tasks on the accessed application. An exemplary voice processing system is described in commonly owned application Ser. No. 10/645,051 which is incorporated by reference. The system described in the commonly owned application includes a plurality of servers connected by a network, each server including engines for performing tasks including speech recognition, speech synthesis, speaker identification, and the like. Appropriate telephone equipment is connected to voice processing systems in order to provide services over land-line, mobile, voice over IP, or similar telephone infrastructures.

A processing system so configured is capable of running applications such as voice-response product listings and directory assistance services. As disclosed in the commonly owned patent application, the processing system applications may be made modular and may be distributed over any number of servers, accommodating varying loads.

The data underlying the processing system's applications may be updated periodically. One example, in the case of a voice-response product listing, is when the set of available products is updated. Due to the nature of these data changes to the database, the application may need to update grammars and other application databases periodically. One current approach is to create a "snapshot" of the current database, develop a new set of grammars, and then load the snapshot. Unfortunately, loading the grammars and the databases corresponding to the updated application can take a significant amount of time and for many applications this interruption may not be acceptable.

Another approach found in the prior art is to operate two independent systems, complete with independent application servers, independent speech recognition servers, and independent databases. This solution has the disadvantage of requiring at least two servers of each kind, even in situations where one server would be sufficient to handle the total transaction volume.

SUMMARY OF THE INVENTION

The invention broadly and generally provides a method of updating an application in a processing system, the aforesaid method comprising the steps of: (a) starting operation of a first version of an application in the aforesaid processing system; (b) starting operation of a second version of the aforesaid application in the aforesaid processing system; and (c) incrementally reallocating processing system resources from the aforesaid first version of the aforesaid application to a second version of the aforesaid application, such that at most one application selected from the aforesaid first version and the aforesaid second version of the aforesaid application operates at full capacity at any time, and such that at least one of the aforesaid first version and the aforesaid second version of the aforesaid application is operating at all times.

In example beneficial embodiments of this invention, new user interactions with the aforesaid first version of the aforesaid application are restricted following user interactions with the aforesaid second version of the aforesaid application, thus providing the user(s) with the perception that the update has been performed instantaneously.

Exemplary applications include directory assistance or product listing applications suitable for use in a voice response system.

The invention further broadly and generally provides a method of updating a processing system, the aforesaid system comprising a plurality of computing resource units wherein at least two of the aforesaid resource units are initially allocated to a first application, and wherein the aforesaid processing system has insufficient resources to simultaneously run both of the aforesaid first application and a second application at full capacity, the aforesaid method comprising the steps of: (a) de-allocating fewer than all of the aforesaid resource units allocated to the aforesaid first application; (b) then allocating at least one resource unit to a second application; and (c) then de-allocating at least one resource unit from the aforesaid first application.

The invention further broadly and generally discloses repeating the aforesaid step of allocating at least one resource unit to a second application and the aforesaid step of de-allocating at least one resource unit from the aforesaid first application until no resource units remain allocated to the aforesaid first application.

The aforesaid methods may be applied where the aforesaid processing system executes speech recognition, speech synthesis, or other tasks.

According to the present invention, mappings between applications and resource units may be stored within a configuration file.

According to exemplary aspects of the present invention, once execution of the aforesaid second application has commenced, all subsequent sessions may be assigned to the aforesaid second application.

The invention further broadly and generally provides a voice processing system, comprising:

(a) a task routing system; (b) a plurality of task servers connected to the task routing system through a data network, the aforesaid task servers comprising a plurality of engines of a plurality of types; (c) a configuration file connected to said task routing system comprising a first set of parameter settings for each of the aforesaid types, wherein the aforesaid task routing system selects a set of the aforesaid plurality of engines based on the types of engines in the aforesaid configuration file; and (d) an updater operable to update the aforesaid configuration file with a second set of parameter settings, wherein the aforesaid task routing system reads and applies said second set of parameters and subsequently discontinues application of the aforesaid first set of parameters.

In accordance with the present invention, the aforesaid servers may stop execution of half of the aforesaid engines running the aforesaid first application and then start at least one engine running the aforesaid second application.

DETAILED DESCRIPTION OF PREFERRED EMBODIMENT

Figure 1:
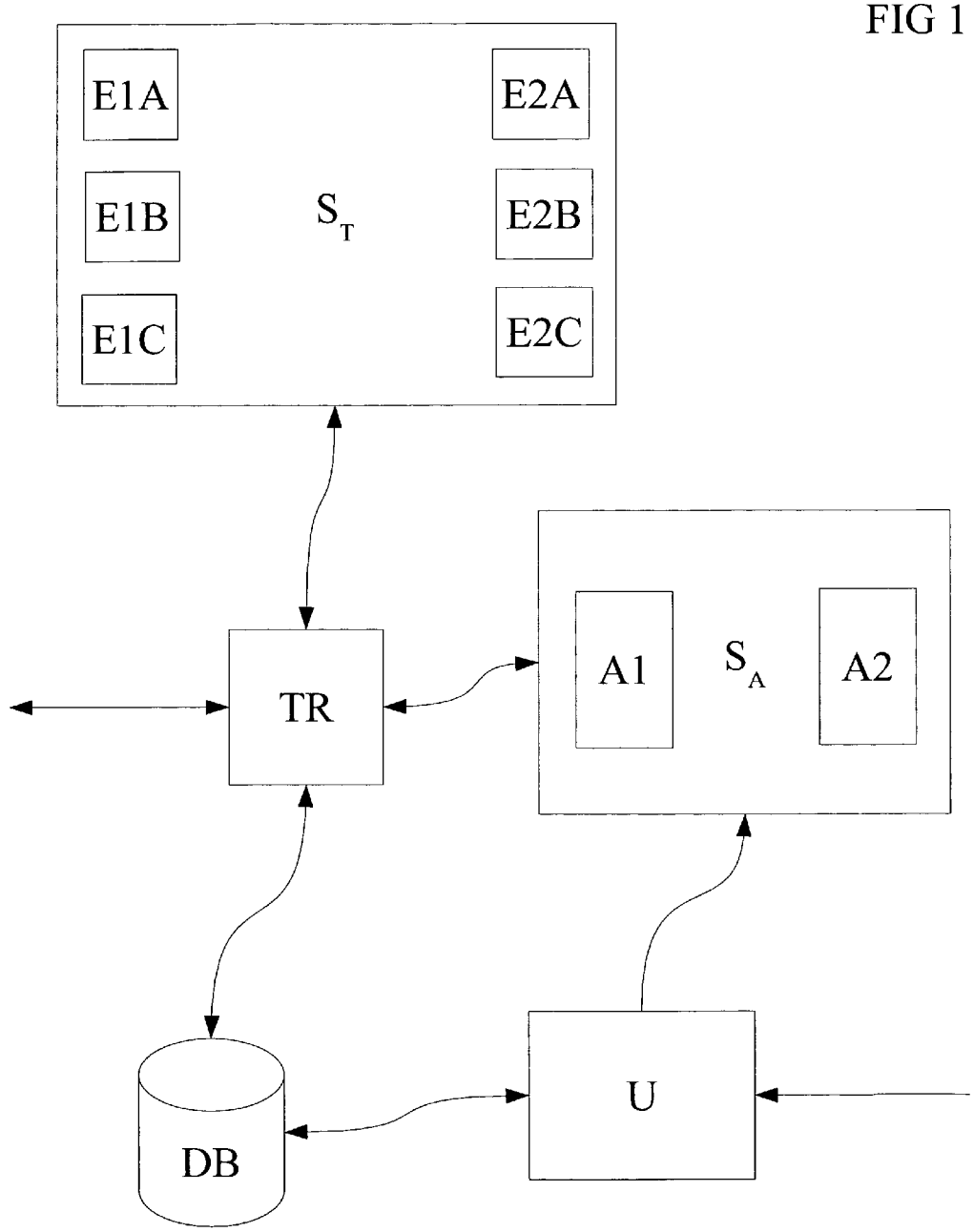
FIG. 1 is a schematic diagram of a processing system providing continuous speech recognition midway through the process of updating. The diagram depicts a task server containing engines, a task router, an application server containing applications, a configuration database, and an updater.

The present invention may be applied to processing systems which require continuous (24×7) operation and where there are insufficient system resources available to permit simultaneous full capacity operation of two instances of the application (and associated data) to be updated. By sharing the available system resources between old and new versions of an application, the present invention enables an old version of an application to be replaced with a new version without any apparent discontinuity in application availability. During the updating of the application, either or both of the applications (old and new) may operate at a reduced capacity to permit continuous operation without requiring the system resources that would be necessary to operate both applications at full capacity, as demonstrated by the following examples:

In an embodiment of the present invention, a computing system has two processors (system resources). Each processor has been employed to execute tasks associated with a first application. In order to update this system to run a second application (rather than the first application), a method in accordance with the present invention may be used: (a) one of the system's two processors is de-allocated from the first application; (b) a processor (in this case, the same processor as in step "a") is allocated to the second application; and (c) the other processor is de-allocated from the first application. At this point, the transition of resources to the second application can be completed by allocating the processor which was de-allocated in this step to the second application. At least one of the two applications has been running throughout the process and the system did not need the four processors which would be necessary to run both applications at full (ordinary) capacity.

In another embodiment of the present invention, a computing system has five disk-drives (system resources). Four of the five disk-drives have been employed to store data relating to a first application. For this example, assume each drive contains sufficient data for an application to run, at a reduced capacity and that four or five drives would be required for full capacity operation (as could be imagined in the case of simultaneous drive data requests). In order to update this system to run a second application, a method in accordance with the present invention may be used: (a) zero of the four disk-drives are de-allocated from the first application (leaving the first application running at full capacity); (b) one disk-drive is allocated to the second application (the second application can now run simultaneously); and (c) one of the four disk drives allocated to the first application is de-allocated. This process can repeat until four (or even all) of the disk-drives are allocated to the second application. As with the first example, at least one of the two applications has been running throughout the process and the system did not need the four processors which would be necessary to run both applications at full capacity.

For the purposes of the present invention, resource units need not be of a standard size and may therefore be simply referred to as "resources." Further, it is expected that the resources (memory space or CPU time, for example) that are consumed by different versions of applications will likely be variable. A resource unit, however, should be large enough to facilitate the execution of a relevant application in some limited (less than full) capacity.

It should be understood that the methods of the present invention can be used to update a broad range of applications deployed on a broad range of system configurations. Several applications may be associated with resources residing on a single computer. Likewise, a single application may be associated with resources found on several computers within the system. The following embodiment provides an example of how the invention may be used with a system configured similar to those described in the aforementioned commonly owned application:

In FIG. 1, a server $S_T$ is configured to run three engines E1A, E1B, E1C to execute speech recognition tasks as required by a first application A1. The application A1 runs on an application server $S_A$. A task router TR routes tasks between engines E1A, E1B, E1C and the applications A1 on the application server $S_A$ based on a configuration stored in the configuration database DB. During the ordinary operation of the processing system, a task router TR receives speech input from a telephone and creates a speech recognition task which is sent to at least one engine. The engine converts the speech into text and returns the text to the task router TR. The task router then sends the text to an application A1 on the application server $S_A$. The application A1 does some processing based on the text and sends a text response to the task router TR. The task router then sends the text response to an engine on the task server $S_T$ to be converted into speech. The engine returns a speech response to the task router TR which, in turn, plays the speech back through the telephone. This sequence of activities can take place any number of times and it should be appreciated that a significant number of users may simultaneously interact with the applications.

In an exemplary voice-response directory-assistance application, the first engine type executes speech recognition tasks which transform audio data input into textual data output. There are two engines running of this type. The second engine type performs text-to-speech tasks which transform textual data input into audio data output. There are also two engines running of this type. During typical operation, this directory-assistance application may, but need not necessarily, share computing resources with other applications. Users of the directory assistance application call the system by telephone and speak the name of the person for whom directory information is requested. The spoken name represents a task to be processed by some speech recognition engine and the task router routes the task to one of the possibly many engines capable of processing a speech recognition task. The engine responds with the appropriate text corresponding to the audio data. After the application obtains a result of a directory query, the application creates a new text-to-speech task containing a response to the caller's query in the form of text. The task router TR routes this new text-to-speech task to an available engine capable of processing the task and sends the resulting audio data to be played to the caller. This process is repeated with different callers and different queries (often in parallel) during normal operation.

Figure 2:
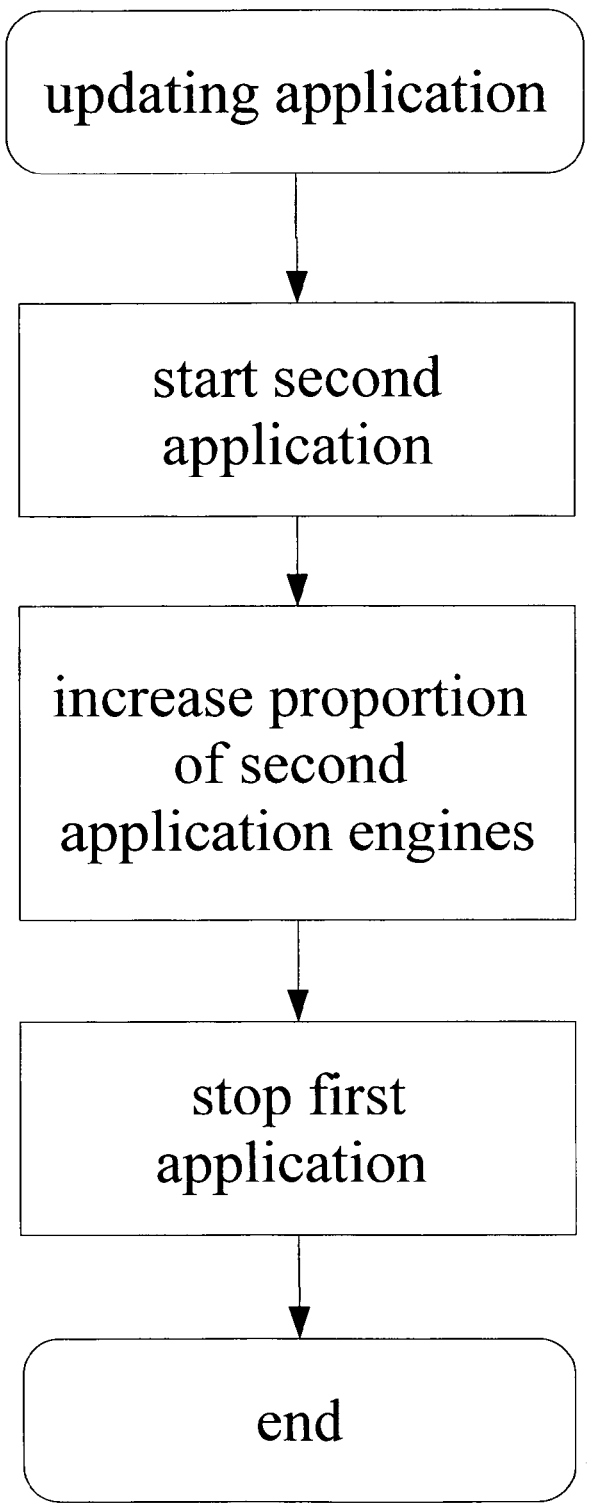
FIG. 2 shows a flowchart that schematically illustrates an exemplary embodiment of a method in accordance with the present invention.
Figure 3:
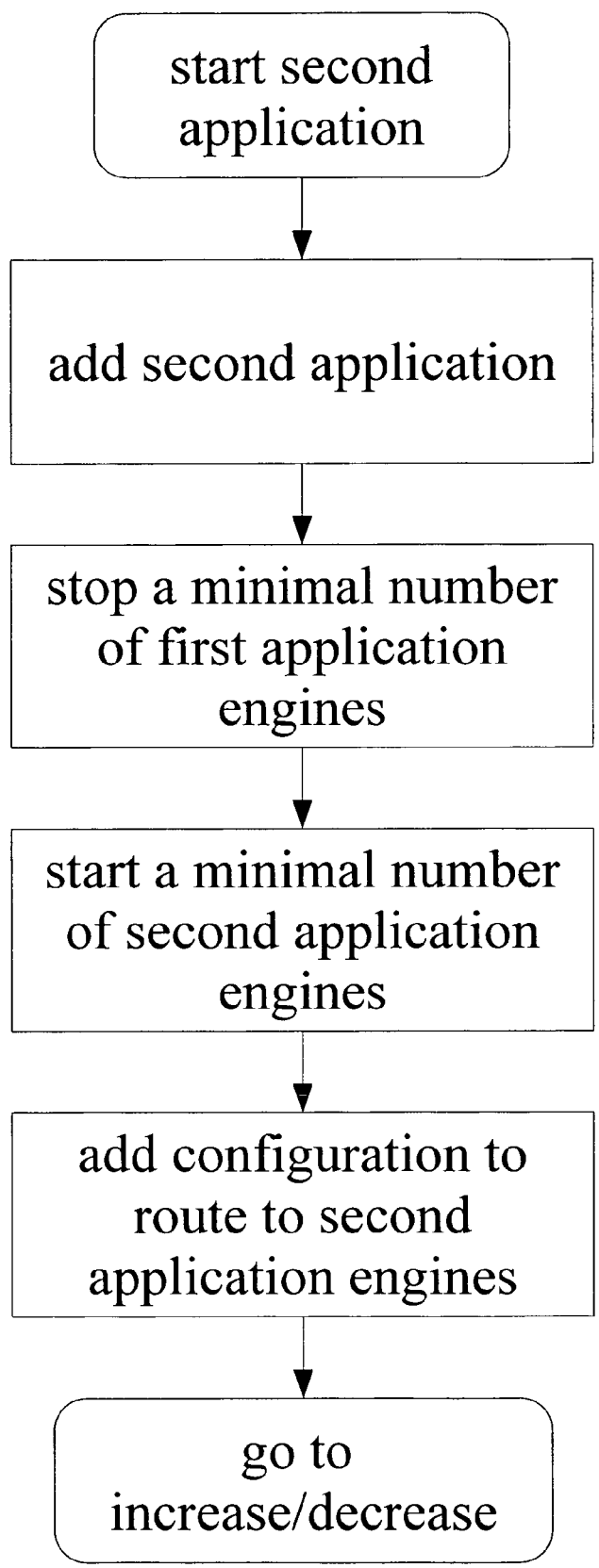
FIG. 3 shows a flowchart detail of the start second application step of the method shown in FIG. 2.

The present invention enables the data or logic comprising the directory-assistance application to be updated (replaced with newer data or logic) without interrupting the operation of the application as perceived by the callers. FIG. 2 shows an overview of the process of updating. In the present example, this update is accomplished by first providing updated application logic which corresponds to updated text to speech engine types and data. The updater changes the system database DB in order to reduce the number of instances of text-to-speech and speech recognition engines which are running the older version of the application from two to one. The task server responds to the change in the system database by halting the operation of one engine of each type when that engine has completed any current tasks. The updater changes the system database DB again to add engine types corresponding to the updated application and data. In FIG. 3, the updater starts the second application A2 on the application server $S_A$ and creates records in the configuration database DB to tell the task router TR how to route tasks between the second application A2 and its required engine types E2A, E2B, E2C.

The task server creates engines corresponding to the updated engine-types as shown in FIG. 3. At this point, the system is configured as in FIG. 1 where engines E1A, E1B, and E1C correspond to the original application A1, and engines E2A, E2B, and E2C correspond to the updated application A2. The updater then turns on the updated application A2 by instructing the task router TR to begin routing tasks between the updated application A2 and its corresponding engines E2A, E2B, and E2C. While the capacity of application A1 is reduced, its operation is not interrupted and the updated application A2 compensates for the reduced capacity of the original application A1.

Figure 4:
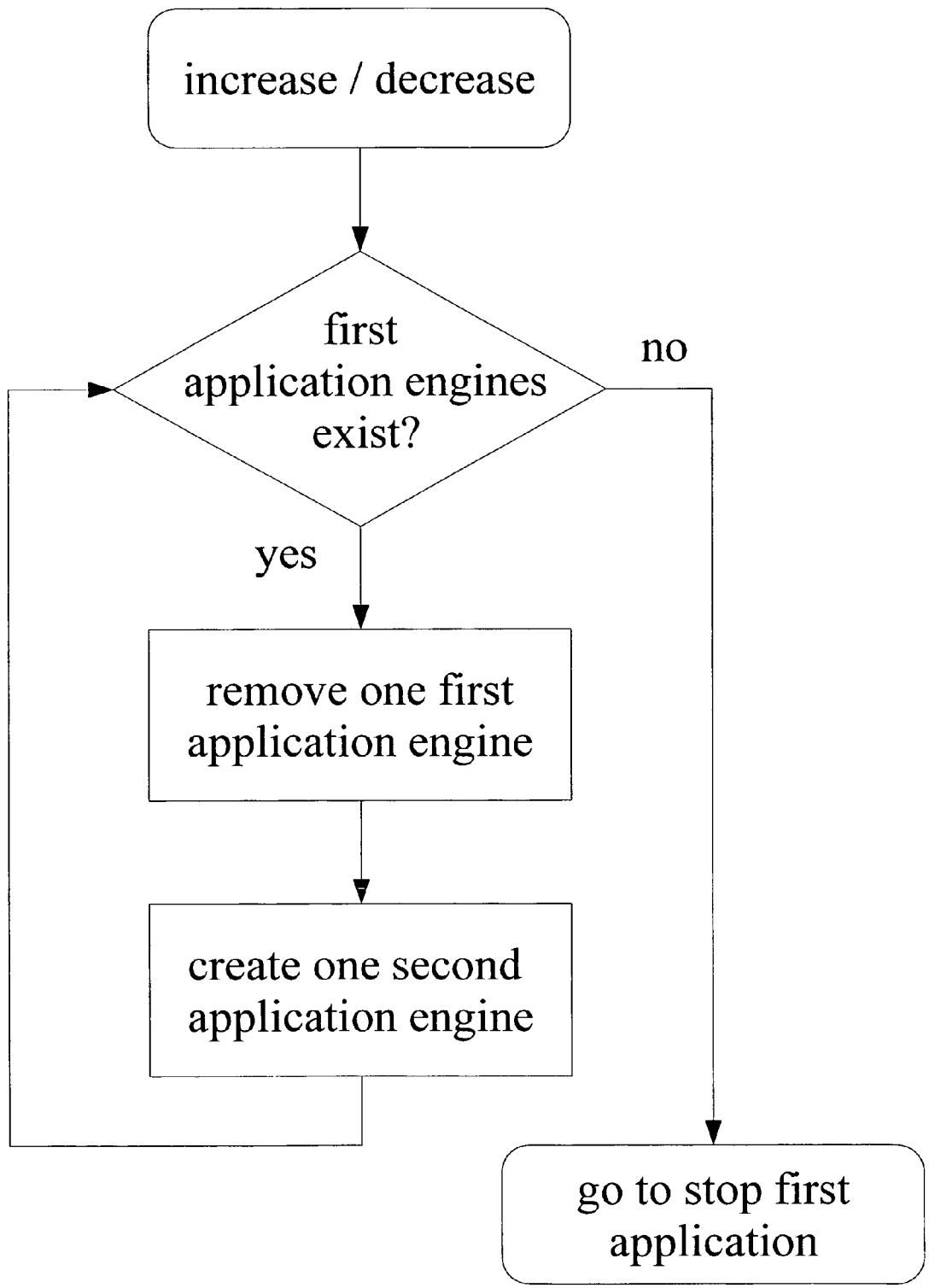
FIG. 4 shows a flowchart detail of the increase and decrease step of the method shown in FIG. 2.
Figure 5:
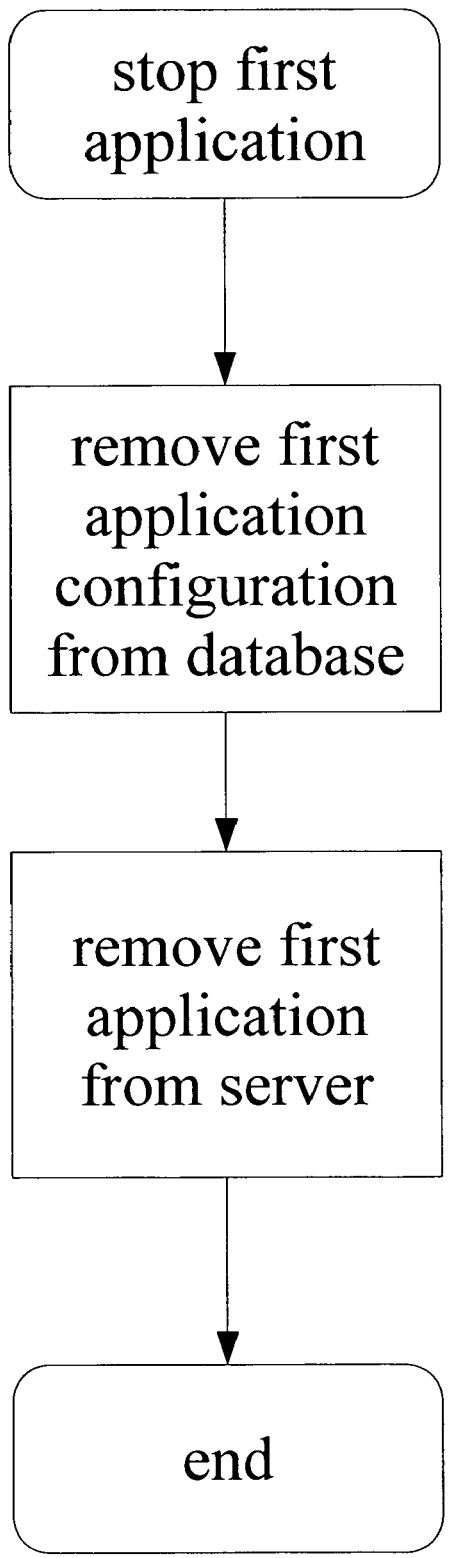
FIG. 5 shows a flowchart detail of the stop first application step of the method shown in FIG. 2.

Following the establishment of the updated application A2 and its associated engines E2A, E2B, and E2C, the remaining engines E1A, E1B, and E1C associated with the original application A1 are halted and the original application A1 is removed from the application server $S_A$ as in FIG. 5. The updater U then instructs the task router TR through a database record in the database DB to stop one of each type of engine corresponding to the first application A1. The updater U watches the database DB to see when the engines have in fact stopped. Alternative embodiments may make several rounds of adjustments, incrementally increasing the ratio of engines associated with the updated application A2 before finally stopping the execution of the original application A1 as shown in FIG. 4.

While changes and variations to the embodiments may be made by those skilled in the field, the scope of the invention is to be determined by the appended claims.

What is claimed is:

1. A method of updating an application in a processing system, said method comprising:
    starting operation of a first version of an application in said processing system;
    starting operation of a second version of said application in said processing system; and
    incrementally reallocating processing system resources from said first version of said application to a second version of said application, such that at most one application selected from said first version and said second version of said application operates at full capacity at any time, and such that at least one of said first version and said second version of said application is operating at all times,
    wherein new user interactions with said first version of said application are restricted following user interactions with said second version of said application,
    wherein said processing system comprises a voice response system, and
    wherein said application is selected from the set consisting of a product listing application and a directory assistance application.

* * * * *